May 15, 1923.                                        1,455,758
D. BOURQUE
TURNBUTTON FASTENER
Filed April 13, 1921

Inventor:
David Bourque
by Emery, Booth, Janney + Varney
Attys.

Patented May 15, 1923.

1,455,758

UNITED STATES PATENT OFFICE.

DAVID BOURQUE, OF AMESBURY, MASSACHUSETTS, ASSIGNOR TO G. W. J. MURPHY COMPANY, OF AMESBURY, MASSACHUSETTS, A CORPORATION OF MASSACHUSETTS.

TURNBUTTON FASTENER.

Application filed April 13, 1921. Serial No. 460,862.

*To all whom it may concern:*

Be it known that I, DAVID BOURQUE, a citizen of the United States, and a resident of Amesbury, county of Essex, and State of Massachusetts, have invented an improvement in Turnbutton Fasteners, of which the following description, in connection with the accompanying drawings, is a specification, like characters on the drawings representing like parts.

This invention relates to turnbutton fasteners and the object is to provide a device of this character of superior durability.

Figure 1:
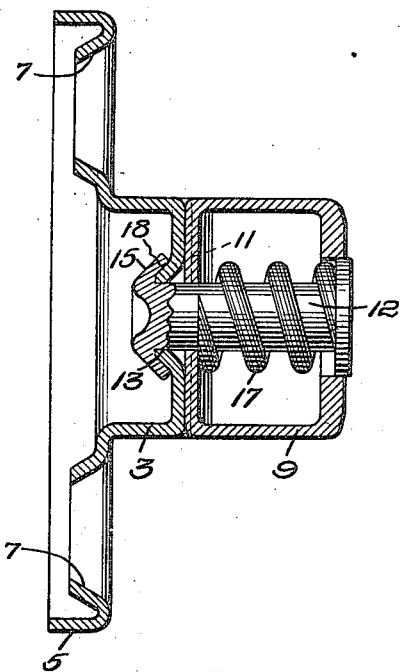
Figure 2:
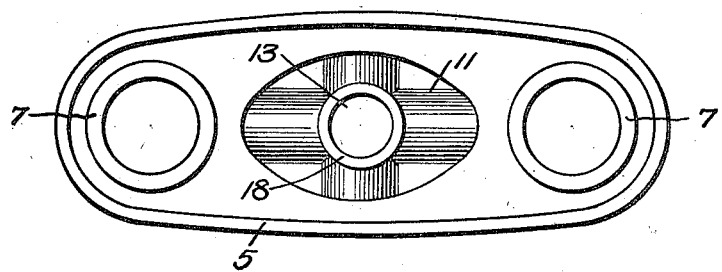

My invention will best be understood by reference to the following description of the illustrative embodiment thereof shown by way of example in the accompanying drawings, wherein:

Fig. 1 is a central vertical section through a turnbutton fastener exemplifying my invention; and Fig. 2 is a bottom plan view as seen from the left of Fig. 1 of the base member of such fastener.

Referring to the drawings, the fastener comprises an oblate base member 3 struck up from sheet metal and provided with any suitable means for fastening it to the work herein exemplified by the integral attaching flange 5 provided with holes 7 to receive screws. On the front wall of the member 3 is swivelled the correspondingly oblate head 9 which may be provided as usual with projections adapted to seat in the diametrical recesses 11 (see Fig. 2) formed in the front wall of the base member so that the head may be positioned in two positions of adjustment either aligned with the base member to permit an eyelet to be placed over the head into encircling relation to the base member 3 or in traversing relation to such member to hold the eyelet in such position.

In the present example of my invention the head is swivelled on the front wall of the base member 3 by means of a shank which may take the form of a headed pin 12 extending inwardly through the aperture 13 in the front wall of the base member and having a retaining enlargement or head 15 on the inner end thereof. I have herein shown a spring 17 interposed between the outer head of the pin and the inner wall of the head normally pressing the head 9 against the base member and holding it seated in the grooves 11 in well known manner, the head being drawn outwardly somewhat against the force of the spring 17 when it is turned in the operation of the fastener. The pin 12 may conveniently be a tubular rivet which is upset or burred over at 15 to retain the head in position.

In accordance with my invention the front wall of the base member 3 is provided marginally of the aperture 13 with an inwardly extending flange 18, which may be somewhat frusto conical as shown, and the rivet is upset at 15 over this flange, the end of which provides a bearing for the same. By this construction not only is the base member 3 made more rigid as a whole but a direct resistance is provided against the pull of the pin 12 due to the pressure of the spring 17 or the pressure caused by the pull of an element secured by the fastener against the head in its traversing position. If the front wall of the fastener were relatively flat about the opening 13 it could more readily be bent and the whole fastener structure weakened and in the course of time the fastener might become wabbly, less positive in its action and because of disalignment of the parts unsightly in appearance. The provision of the inwardly extending flange, moreover, has the advantage of providing an elongated bearing for the heading over of the rivet 12 at 15 and provides for the fastening of this pin or rivet in this or some similar manner effectively without danger of distorting the base itself during the operation.

Having thus described my invention, what I claim as new and desire to secure by Letters Patent I shall express in the following claims.

Claims:

1. A turnbutton fastener comprising a sheet metal base having an aperture therein surrounded by an inwardly extending flange, a head, a spring in the head and a member connected to the spring, extending through the aperture and having a bearing on the end of the flange.

2. A turnbutton fastener comprising a sheet metal base having an aperture therein surrounded by an inwardly extending flange, a head, a spring in the head and a tubular rivet connected to the spring extending through the aperture and upset over the flange.

In testimony whereof, I have signed my name to this specification.

DAVID BOURQUE.